US011761777B2

(12) United States Patent
Xia et al.

(10) Patent No.: US 11,761,777 B2
(45) Date of Patent: Sep. 19, 2023

(54) NAVIGATION METHOD AND APPARATUS BASED ON ELECTRONIC MAP, DEVICE AND MEDIUM

(71) Applicant: BAIDU ONLINE NETWORK TECHNOLOGY (BEIJING) CO., LTD., Beijing (CN)

(72) Inventors: Deguo Xia, Beijing (CN); Chengzhou Li, Beijing (CN); Hailu Jia, Beijing (CN); Jinyi Lei, Beijing (CN); Jinggang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/032,109

(22) Filed: Sep. 25, 2020

(65) Prior Publication Data
US 2021/0223055 A1 Jul. 22, 2021

(30) Foreign Application Priority Data
Jan. 21, 2020 (CN) .......................... 202010072557.1

(51) Int. Cl.
*G01C 21/36* (2006.01)
*G01C 21/34* (2006.01)

(52) U.S. Cl.
CPC ..... *G01C 21/3484* (2013.01); *G01C 21/3602* (2013.01); *G01C 21/3617* (2013.01); *G01C 21/3676* (2013.01)

(58) Field of Classification Search
CPC ............ G01C 21/3484; G01C 21/3602; G01C 21/3617; G01C 21/3676
See application file for complete search history.

(56) References Cited

U.S. PATENT DOCUMENTS

2021/0088349 A1* 3/2021 Li .................... G01C 21/3484

FOREIGN PATENT DOCUMENTS

CN 107389085 A * 11/2017
WO WO-2017015882 A1 * 2/2017 ......... G01C 21/3629

OTHER PUBLICATIONS

Machine Translation of CN-107389085-A (Year: 2017).*

* cited by examiner

*Primary Examiner* — Faris S Almatrahi
*Assistant Examiner* — Sahar Motazedi
(74) *Attorney, Agent, or Firm* — Lippes Mathias LLP

(57) ABSTRACT

The present disclosure discloses a navigation method, a device, and a medium. The method includes: planning candidate routes based on a start position and an end position of a user, and obtaining a sequence of candidate road sections in each candidate route; matching each candidate road section in the sequence of candidate road sections in each candidate route with an association relationship between an actual road section and actual road auxiliary information, to obtain a sequence of auxiliary information of each candidate route; and sorting the auxiliary information in the sequence of auxiliary information of each candidate route to obtain a sorted result corresponding each candidate route, and selecting target road auxiliary information from the sequence of auxiliary information of each candidate route based on the sorted result, so as to select a target route from the candidate routes based on the target road auxiliary information.

15 Claims, 9 Drawing Sheets

NAVIGATION METHOD AND APPARATUS BASED ON ELECTRONIC MAP, DEVICE AND MEDIUM

CROSS-REFERENCE TO RELATED APPLICATION

This application claims priority to and benefits of Chinese Patent Application Serial No. 202010072557.1, filed the State Intellectual Property Office of P. R. China on Jan. 21, 2020, the entire content of which is incorporated herein by reference.

FIELD

Embodiments of the present disclosure relate to a field of computer technologies and more particularly to a field of navigation technologies, and provides a navigation method and apparatus based on an electronic map, a device, and a medium.

BACKGROUND

With popularity of a positioning device and a navigation electronic map, and an increasing active region of people caused by popularity of a vehicle, a user who drives the vehicle is increasingly dependent on a navigation product. The user completely depends on a route planned by the navigation product when unfamiliar to a road through which the user goes to a destination. Therefore, it is particularly important whether the route may meet a requirement of the user.

Meanwhile, due to different driving proficiencies and different preferences for the road, different users have different choices for routes. How to better meet navigation driving requirements of different users is also an important problem to be solved in route planning of the navigation product.

SUMMARY

Embodiments of the present disclosure discloses a navigation method based on an electronic map. The method includes: planning candidate routes based on a start position and an end position of a user, and obtaining a sequence of candidate road sections in each candidate route; matching each candidate road section in the sequence of candidate road sections in each candidate route with an association relationship between an actual road section and actual road auxiliary information, to obtain a sequence of auxiliary information of each candidate route; and sorting the auxiliary information in the sequence of auxiliary information of each candidate route to obtain a sorted result corresponding each candidate route, and selecting target road auxiliary information from the sequence of auxiliary information of each candidate route based on the sorted result, the target road auxiliary information being configured to select a target route from the candidate routes based on the target road auxiliary information.

Embodiments of the present disclosure also provide an electronic device. The electronic device includes: at least one processor and a memory. The memory is communicatively coupled to the at least one processor. The memory is configured to store instructions executable by the at least one processor. When the instructions are executed by the at least one processor, the at least one processor is caused to execute the navigation method based on an electronic map according to any one of embodiments.

Embodiments of the present disclosure also provide a non-transitory computer readable storage medium having computer instructions stored thereon. The computer instructions are configured to cause a computer to execute the navigation method based on an electronic map according to any one of embodiments.

Other effects achieved by the above alternative embodiments will be described below with reference to detailed embodiments.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding, and should be regarded as merely exemplary. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

Embodiments of the present disclosure provides a navigation method based on an electronic map for a problem of how to better meet navigation and driving requirements of different users in the related art.

In embodiments of the present disclosure, by obtaining a sequence of candidate road sections in each candidate route planned based on a start position and an end position of a user, each candidate road section in the sequence of candidate road sections in each candidate route is matched with an association relationship between an actual road section and actual road auxiliary information, to obtain a sequence of auxiliary information of each candidate route, the auxiliary information in the sequence of auxiliary information of each candidate route is sorted to select target road auxiliary information from a sorted result, and a target route is selected from the candidate routes based on the target road auxiliary information. Therefore, in a navigation procedure, by providing the planned routes and the auxiliary information of the routes to the user, the user may select a route that meets his/her own requirement based on the auxiliary information of the routes, thereby meeting a personalized requirement of the user for route selection and providing a reference for the user to select the route.

Description will be made in detail below to a navigation method and apparatus based on an electronic map, a device and a medium according to embodiments of the present disclosure with reference to accompanying drawings.

Embodiment 1

Figure 1:
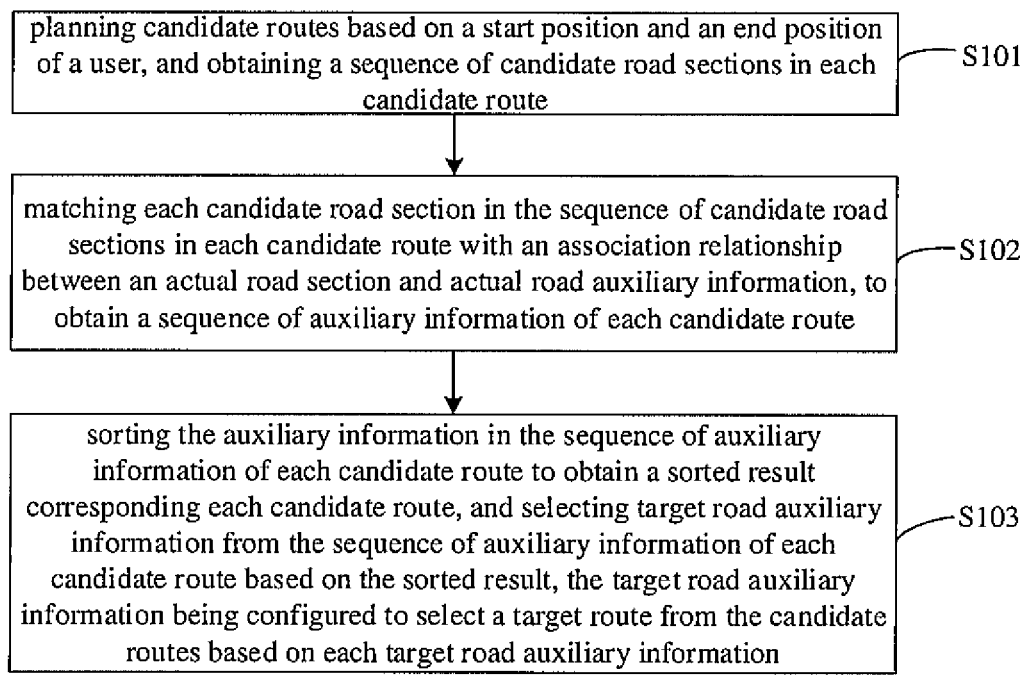
FIG. 1 is a flow chart illustrating a navigation method based on an electronic map according to Embodiment 1 of the present disclosure.

FIG. 1 is a flow chart illustrating a navigation method based on an electronic map according to Embodiment 1 of the present disclosure. Embodiments of the present disclosure may be applied to a scene of determining a target route from candidate routes provided based on the electronic map. The method may be executed by a navigation apparatus based on an electronic map. The apparatus may be realized by software and/or hardware, and may be integrated inside an electronic device. In this embodiment, the electronic device may be any hardware device with a navigation function, such as a vehicle-mounted computer and an intelligent phone. The method includes actions at following blocks.

At block S101, candidate routes are planned based on a start position and an end position of a user, and a sequence of candidate road sections in each candidate route is obtained.

Alternatively, a user may initiate a navigation request to an electronic device with a navigation function, to trigger execution of the action at block S101 by the navigation request. The navigation request includes the start position and the end position. In this embodiment, the start position and the end position may be inputted when the user initiates the navigation request. The start position may also be a current position of the electronic device obtained according to the end position inputted by the user based on a positioning technology, i.e., the current position is taken as the start position, which is not limited here.

In an embodiment of the present disclosure, after the start position and the end position are obtained, at least two candidate routes from the start position to the end position may be planned based on the start position, the end position and a preset electronic map. It should be noted that, in the present disclosure, planning the candidate routes based on the start position and the end position may be implemented based on an existing planning algorithm, which is not elaborated herein. The planning algorithm refers to any algorithm for implementing route planning, such as a navigation algorithm.

Further, each candidate route may be composed of at least two road sections. Therefore, in embodiments of the present disclosure, the sequence of candidate road sections in each candidate route may also be obtained after the candidate routes are planned, to lay a foundation for determining auxiliary information of each candidate route subsequently. In a detailed implementation, the sequence of candidate road sections in each candidate route may be obtained based on the preset electronic map and the candidate routes.

Figure 2:
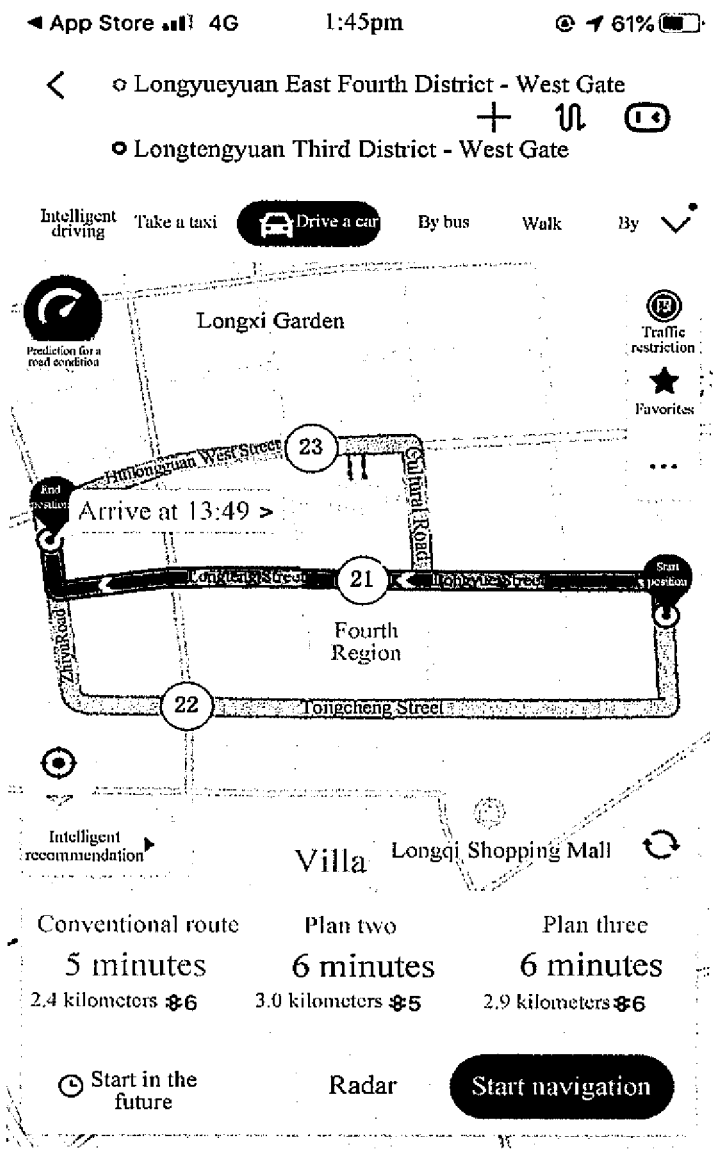
FIG. 2 is a schematic diagram illustrating planning candidate routes based on a start position and an end position of a user according to Embodiment 1 of the present disclosure.

For example, when the user inputs a start position "Longyueyuan East Fourth District—West Gate" and an end position "Longtengyuan Third District—West Gate", there are three candidate routes planned based on the preset electronic map, which are respectively a conventional route, plan two and plan three. The conventional route is marked as 21 on the electronic map, the plan two is marked as 22 on the electronic map, and the plan three is marked as 23 on the electronic map, as illustrated in FIG. 2. After the three candidate routes are obtained, a sequence of candidate road sections in each of the three candidate routes is obtained. The sequence of candidate road sections in the conventional route are: Liangzhuang West Street, Longyue Street, Longteng Street and Zhiyu Road. The sequence of candidate road sections in the plan two is: Liangzhuang West Street, Tongcheng Street and Zhiyu Road. The sequence of candidate road sections in the plan three is: Liangzhuang West Street, Longyue Street, Curtural Road, Huilongguan West Street and Zhiyu Road.

At block S102, each candidate road section in the sequence of candidate road sections in each candidate route is matched with an association relationship between an actual road section and actual road auxiliary information, to obtain a sequence of auxiliary information of each candidate route.

The actual road auxiliary information includes a road surface condition, a heavy-vehicle presence attribute, a path attribute, a charging station attribute, a gas station attribute or a service area attribute. It should be noted that, the actual road auxiliary information may also include a street lamp attribute, that is, whether the road is lighted at night. In embodiments of the present disclosure, a heavy vehicle refers to a large vehicle such as a truck and a lorry.

In embodiments of the present disclosure, the association relationship between the actual road section and the actual road auxiliary information may be established in advance, or may be established in real time based on the candidate routes planned based on the start position and the end position, which is not limited here.

In detail, after the sequence of candidate road sections in each candidate route is obtained, each candidate road section in the sequence of candidate road sections may be matched with the established association relationship between the actual road section and the actual road auxiliary information to obtain the sequence of auxiliary information corresponding to each candidate route.

In other words, by matching each candidate road section in the sequence of candidate road sections in each candidate route with the association relationship between the actual road section and the actual road auxiliary information, auxiliary information of each candidate road section is obtained, thereby obtaining the sequence of auxiliary information of each candidate route based on the auxiliary information of each candidate road section.

It should be noted that, a procedure of establishing the association relationship between the actual road section and the actual road auxiliary information in this embodiment of the present disclosure will be described in the following examples, which is not be elaborated here.

At block S103, the auxiliary information in the sequence of auxiliary information of each candidate route is sorted to obtain a sorted result corresponding each candidate route, target road auxiliary information is selected from the sequence of auxiliary information of each candidate route based on the sorted result, and the target road auxiliary information being configured to select a target route from the candidate routes based on the target road auxiliary information.

In embodiments of the present disclosure, the target road auxiliary information is similar as the actual road auxiliary information, that is, including the road surface condition, the heavy-vehicle presence attribute, the path attribute, the charging station attribute, the gas station attribute or the service area attribute.

In detail, the auxiliary information in the sequence of auxiliary information of each candidate route may be sorted based on a general sorting strategy and/or a user sorting strategy. The user sorting strategy is determined according to information inputted by the user and/or a selection behavior of the user for a historical candidate route. By sorting the auxiliary information based on a general sorting strategy and/or a user sorting strategy, a preferred road of the user is sorted ahead, thereby meeting a personalized route preference of the user and better assisting the user in route selection.

The general sorting strategy refers to a default sorting strategy preset by the electronic device. The user sorting strategy refers to a sorting strategy set based on the personalized requirement of the user. For example, the user sorting strategy is determined based on a driving type inputted by the user. The driving type includes a beginner and an old driver. Alternatively, the user sorting strategy is determined according to the selection behavior of the user for the historical candidate routes.

It should be noted that, the general sorting strategy and/or the user sorting strategy in embodiments of the present disclosure may be implemented by using an algorithm such as a logistic regression (LR) or a gradient boosting decision tree (GBDT), which is not limited in the present disclosure.

It may be understood that, in embodiments of the present disclosure, the general sorting strategy and/or the user sorting strategy may refer to the general sorting strategy only or the user sorting strategy only, and may also refer to both the general sorting strategy and the user sorting strategy.

Likewise, the information inputted by the user and/or the selection behavior of the user for the historical candidate route may refer to the information inputted by the user only or the selection behavior of the user for the historical candidate route only, and may also refer to both the information inputted by the user and the selection behavior of the user for the historical candidate route, which is not limited in the present disclosure.

Further, after the sequence of auxiliary information of each candidate route is sorted to obtain the sorted result corresponding each candidate route, auxiliary information sorted ahead (such as, sorted at a first position) may be selected from the sorted result of the sequence of auxiliary information of each candidate route as the target road auxiliary information of each candidate route. Thus, the user selects a target route from at least two candidate routes based on the target road auxiliary information of each candidate route.

With the navigation method based on an electronic map according to embodiments of the present disclosure, by obtaining a sequence of candidate road sections in each candidate route planned based on a start position and an end position of a user, each candidate road section in the sequence of candidate road sections in each candidate route is matched with an association relationship between an actual road section and actual road auxiliary information, to obtain a sequence of auxiliary information of each candidate route, the auxiliary information in the sequence of auxiliary information of each candidate route is sorted to select target road auxiliary information from a sorted result, and a target route is selected from the candidate routes based on the target road auxiliary information. Therefore, in a navigation procedure, by providing the planned routes and the auxiliary information of the routes to the user, the user may select a route that meets his/her own requirement based on the auxiliary information of the routes, thereby meeting a personalized requirement of the user for route selection and providing a reference for the user to select the route.

Embodiment 2

Figure 3:
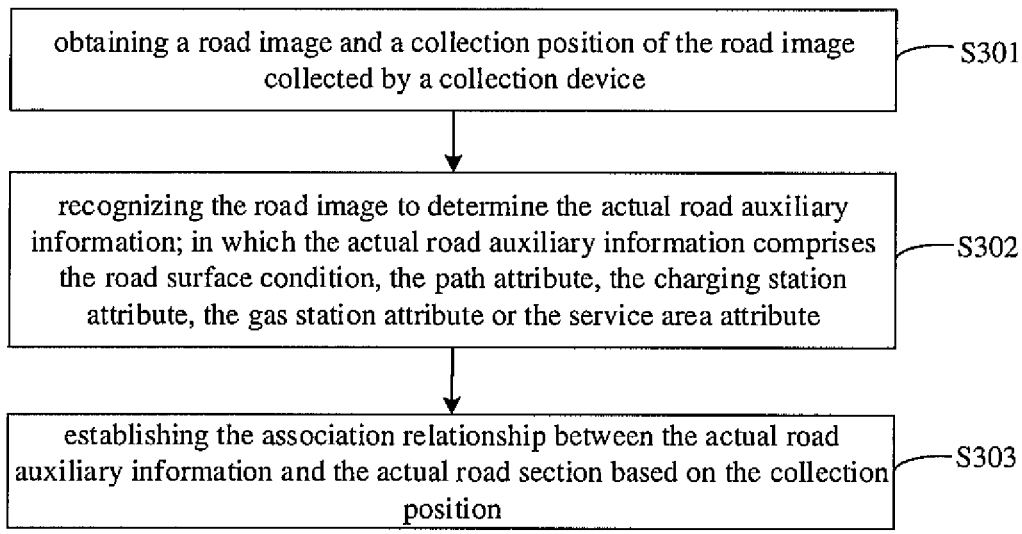
FIG. 3 is a flow chart illustrating establishing an association relationship between an actual road section and actual road auxiliary information according to Embodiment 2 of the present disclosure.
Figure 4:
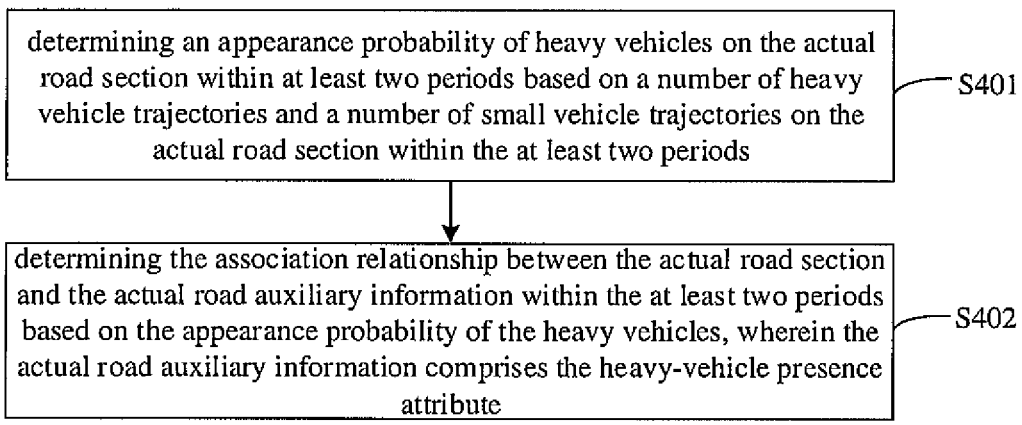
FIG. 4 is a flow chart illustrating establishing an association relationship between an actual road section and actual road auxiliary information according to Embodiment 2 of the present disclosure.

With reference to FIG. 3 and FIG. 4, description will be made below to establishing the association relationship between the actual road section and the actual road auxiliary information in the navigation method based on an electronic map according to embodiments of the present disclosure.

It should be noted that, in embodiments of the present disclosure, the actual road auxiliary information includes a road surface condition, a heavy-vehicle presence attribute, a path attribute, a charging station attribute, a gas station attribute or a service area attribute. The road surface condition, the path attribute, the charging station attribute, the gas station attribute or the service area attribute are determined based on an road image, and the heavy-vehicle presence attribute is determined based on vehicle trajectory data, that is, the way for determining the heavy-vehicle presence attribute is different from that of other auxiliary information.

First, with reference to FIG. 3, description will be made to establishing the association relationship between the actual road section and the actual road auxiliary information for a case of the actual road auxiliary information including the road surface condition, the path attribute, the charging station attribute, the gas station attribute or the service area attribute. A procedure for establishing the association relationship includes the followings.

At block S301, a road image and a collection position of the road image collected by a collection device are obtained.

In embodiments of the present disclosure, the collection device may be any hardware device with a capturing function, such as a video camera or a camera. The collection position of the road image refers to a road section to which the road image belongs. It should be noted that, in embodiments of present disclosure, the collection device may have a positioning function, that is, the collection position of the road image may be determined based on a position obtained by employing the location function of the collection device, which is not limited here.

The road image includes a video or an image.

Alternatively, in this embodiment, obtaining the road image and the collection position of the road image collected by the collection device may be implemented in the following ways.

Way one: the collection device sends the obtained road image and the collection position of the road image to the electronic device every predetermined period.

The predetermined period may be set based on an actual requirement, such as 5 hours (h) or one day.

Way two: an obtaining instruction is sent to the collection device, such that the collection device feeds back the obtained road image and the collection position of the road image to the electronic device.

It should be noted that, the above two ways are only exemplary descriptions of embodiments of the present disclosure, and are not taken as specific limitations.

At block S302, the road image is recognized to determine the actual road auxiliary information. The actual road auxiliary information includes the road surface condition, the path attribute, the charging station attribute, the gas station attribute or the service area attribute.

Alternatively, after the road image collected by the collection device is obtained, the road image may be classified based on a convolutional neural network (CNN) model or other image classification model of deep learning to determine the actual road auxiliary information. The convolutional neural network model is trained and generated based on an existing method, which is not be elaborated here.

The road surface condition in the actual road auxiliary information includes whether the road has a pothole, and a level of the pothole. The path attribute includes whether the road is a path. The charging station attribute, the gas station attribute and the server region attribute include whether there is a charging station, a gas station and a service area on the road.

At block S303, the association relationship between the actual road auxiliary information and the actual road section is established based on the collection position.

For example, when the collected road image belongs to an actual road section xx1, and actual road auxiliary information of the actual road section xx1 is determined as Y1, an association relationship between the actual road section xx1 and the actual road auxiliary information Y1 is established.

An embodiment of the above present disclosure has following advantages or beneficial effects. By obtaining the actual road auxiliary information based on the collected road image, and establishing the association relationship between the actual road auxiliary information and the actual road section based on the collection position collected by the collection device, it realizes mining of dynamic features (a road surface condition) and static features (a path attribute, a charging station attribute, etc.) of the actual road, providing a condition for a subsequent determination of the target route.

Referring to FIG. 4, description may be made below to establishing the association relationship between the actual road section and the actual road auxiliary information for a case of the actual road auxiliary information being the heavy-vehicle presence attribute. A procedure for establishing the association relationship may include the followings.

At block S401, an appearance probability of heavy vehicles on the actual road section within at least two periods is determined based on a number of the heavy vehicle trajectories and a number of small vehicle trajectories on the actual road section within the at least two periods.

The actual road section refers to any road section in the sequence of actual road sections in an actual road.

The at least two periods are obtained by dividing a preset period into a plurality of periods based on a division rule. For example, the preset period is divided into working days and non-working days, and then the working days and the non-working days are respectively divided into a plurality of periods further.

In detail, trajectory data of the heavy vehicle and trajectory data of the small vehicle on each actual road section within the at least two periods may be obtained first, and then a ratio of the number of the heavy vehicle trajectories to a total number of all vehicle trajectories on each actual road section within the at least two periods may be calculated to obtain the appearance probability of the heavy vehicles driven on each road section within the at least two periods. The total number of all the vehicle trajectories refers to a sum of the number of the heavy vehicle trajectories and the number of the small vehicle trajectories. In embodiments of the present disclosure, the trajectory data of the heavy vehicle and the trajectory data of the small vehicle on each actual road section within the at least two periods may be obtained from an end with trajectory data. The end with the trajectory data may refer to a server of a provider who provides the service of the electronic map or a third party. For example, the third party refers to a transportation party that cooperates with the provider who provides the service of the electronic map.

In a detailed implementation, the appearance probability of the heavy vehicles on the actual road section within the at least two periods may be determined by equation (1), which is $$p_t^c = \frac{N_t^c}{N_t^a}, \quad (1)$$

where, $p_t^c$ represents the appearance probability of the heavy vehicles on the actual road section within the at least two periods, $N_t^c$ represents the number of the heavy vehicle trajectories on the actual road section within the at least two periods, $N_t^a$ represents the total number of all the vehicle trajectories on the actual road section within the at least two periods, t represents the at least two periods, c represents the heavy vehicles, and a represents all the vehicles.

At block S402, the association relationship between the actual road section and the actual road auxiliary information within the at least two periods is determined based on the appearance probability of the heavy vehicles, in which the actual road auxiliary information includes the heavy-vehicle presence attribute.

Exemplarily, in this embodiment, by establishing the association relationship between the actual road section and the heavy-vehicle presence attribute in different periods, it may accurately determine whether there is any heavy vehicles on the actual road section based on a current navigation time, thus an accuracy and an applicability of the navigation are improved.

In other words, in embodiments of the present disclosure, when the actual road auxiliary information in the established association relationship is the heavy-vehicle presence attribute, matching each candidate road section in the sequence of candidate road sections in each candidate route with the association relationship between the actual road section and the actual road auxiliary information to obtain the sequence of auxiliary information of the candidate route may include followings.

Matching each candidate road section in the sequence of candidate road sections in each candidate route with the association relationship between the actual road section and the actual road auxiliary information to obtain the sequence of auxiliary information of the candidate route includes: matching a current time point with the at least two periods to obtain a current period to which the current time point belongs; and matching each candidate road section in the sequence of candidate road sections in each candidate route with an association relationship between an actual road section and actual road auxiliary information within the current period, to obtain a sequence of heavy-vehicle presence attributes of each candidate route.

It should be understood that, with embodiments of the present disclosure, the current time point is matched with the at least two periods to determine which period the current time point belongs to, and the period is taken as the current time period. Then, each candidate road section in the sequence of candidate road sections in each candidate route is matched with the association relationship between the actual road section and the actual road auxiliary information within the current period to obtain the sequence of the heavy-vehicle presence attributes of each candidate route, thus the sequence of auxiliary information of each candidate route is obtained based on the sequence of the heavy-vehicle presence attributes of each candidate route, laying a foundation for the subsequent selection of the target road auxiliary information.

An embodiment of the above present disclosure has following advantages or beneficial effects. By obtaining the number of the heavy vehicle trajectories and the number of the small vehicle trajectories on the actual road section within different periods, the appearance probability of the heavy vehicles may be determined, thereby mining on the feature of the heavy vehicle travelling on the actual road is realized, providing a condition for the subsequent determination of the target route.

Embodiment 3

In another implementing scene of the present disclosure, after the target road auxiliary information is selected from the sequence of auxiliary information of the candidate route, a target copywriting template matched with the target road auxiliary information may also be obtained, and an auxiliary selection message of a candidate route is generated based on the target copywriting template, such that the user selects a target route from the candidate routes based on the auxiliary selection message, thereby a favorable condition is provided for the user to select a navigation route. Description may be made below to the above situation of the navigation method based on an electronic map according to embodiments of the present disclosure with reference to FIG. 5.

Figure 5:
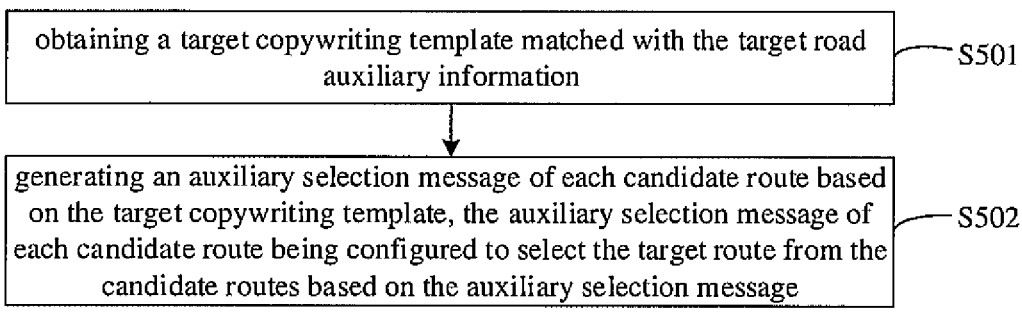
FIG. 5 is a flow chart illustrating a navigation method based on an electronic map according to Embodiment 3 of the present disclosure.

FIG. 5 is a flow chart illustrating a navigation method based on an electronic map according to Embodiment 3 of the present disclosure. As illustrated in FIG. 5, the method includes the followings.

At block S501, a target copywriting template matched with the target road auxiliary information is obtained.

In this embodiment of the present disclosure, a plurality of types or forms of copywriting templates may be preset, and a preset copywriting template may be updated, deleted, added, etc., which is not limited here.

In detail, the target road auxiliary information is matched with the preset copywriting templates to obtain the target copywriting template. The target road auxiliary information of each candidate route is matched with the preset copywriting templates to obtain the target copywriting template corresponding to each candidate route.

As an alternative implementation, the target road auxiliary information may be matched with a keyword in the preset copywriting templates. When the target road auxiliary information is matched with a keyword of any copywriting template, the copywriting template is the target copywriting template.

At block 502, an auxiliary selection message of each candidate route is generated based on the target copywriting template, and a target route is selected from the candidate routes based on the auxiliary selection message.

Alternatively, after the target copywriting template is obtained, the auxiliary selection message of each candidate route may be generated based on a copywriting generation algorithm, such that the user may select the target route from at least two candidate routes based on the auxiliary selection message.

In order to further facilitate the user to select the target route, in embodiments of the present disclosure, after the auxiliary selection message is generated, the generated auxiliary selection message and a reminding icon may also be displayed on each candidate route. The reminding icon may be set based on an actual requirement, such as an exclamation mark or a warning symbol.

Figure 6A:
FIG. 6($a$)-FIG. 6($d$) are schematic diagrams illustrating generating an auxiliary selection message and a reminding icon of a candidate route according to Embodiment 3 of the present disclosure.
Figure 6A:
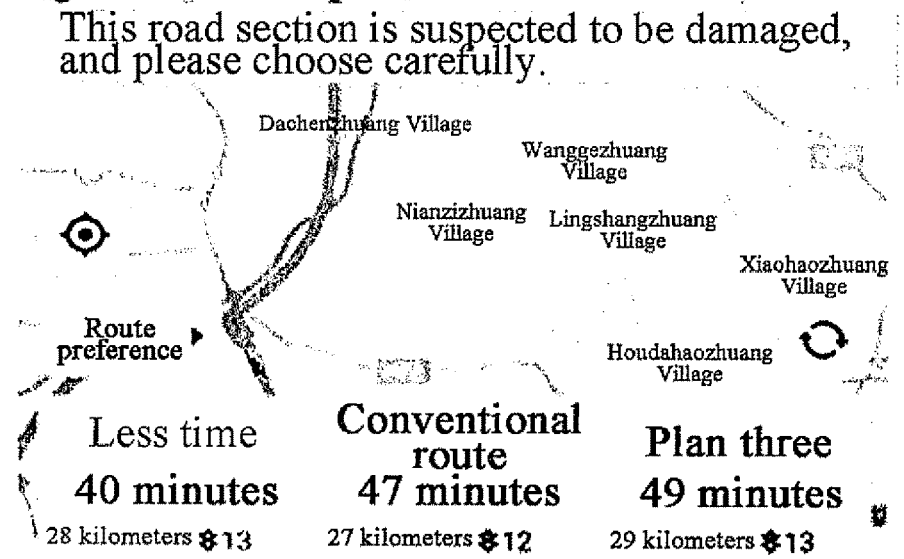

For example, as illustrated in FIG. 6(a), the start position of the user is "No. 4 community", and the end position of the user is "Experimental primary school, Guye District, Tangshan City", and there are three candidate routes, which are respectively plan one taking less time, a conventional route, and plan three. The candidate route passing "Shanshen Line" in the plan one has road auxiliary information of "there are potholes on the road". The road auxiliary information "there are potholes on the road" is matched with the preset target copywriting templates to obtain a target copywriting template as template a first template. An auxiliary selection message of the plan one is generated based on the first template by utilizing the copywriting generation algorithm, and the auxiliary selection message is "The road section is suspected to be damaged, and please choose carefully". Then, the auxiliary selection message is displayed on the "Shanshen Line", and a reminding icon is displayed, to assist the user in selecting the target route.

Figure 6B:
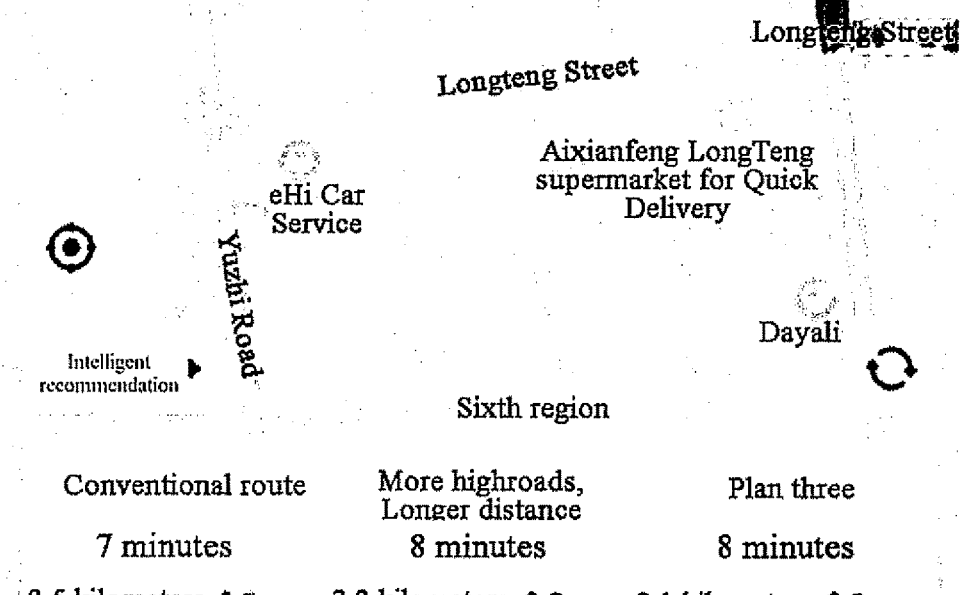

For another example, as illustrated in FIG. 6(b), the start position of the user is "Longyueyuan East Fourth District—West Gate", the end position of the user is "Longtengyuan Third District—West Gate", and there are three candidate routes, that is, a conventional route, plan two with more highroads and a longer distance, and plan three. The gray part (marked as 61) of road passed through by the conventional route has road auxiliary information "a path exists" on a gray road section passed through in, thus the road auxiliary information "a path exists" is matched with the preset copywriting templates to obtain the target copywriting template as a fourth template. The auxiliary selection message of the conventional route is generated based on the fourth template by utilizing the copywriting generation algorithm, and the auxiliary selection message is "The route is suspected to be a path, and please pay attention to the traffic capacity". Then the auxiliary selection message is displayed on the gray part of road marked 61, and a reminding icon is displayed, to assist the user in selecting the target route.

Figure 6C:
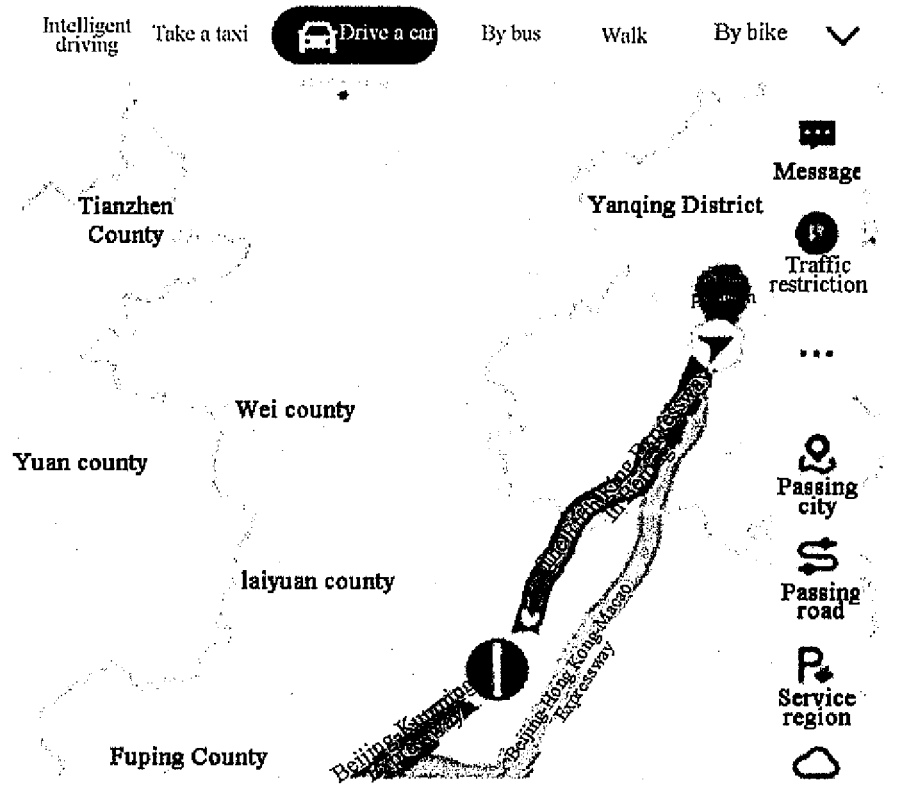

For another example, as illustrated in FIG. 6(c), the start position of the user is "Xi'erqi Haidian District, Beijing", the end position of the user is "Shijiazhuang City", and there are three candidate routes, that is, plan one taking less time, plan two and plan three. There is auxiliary information "there are heavy vehicles and an appearance probability of the heavy vehicles is high" at "Shunping section" on "Beijing-Kunming Expressway" in the candidate route of the plan two within a current period, thus the auxiliary information "there are heavy vehicles and an appearance probability of the heavy vehicles is high" is matched with the preset copywriting templates to obtain the target copywriting template as a second template. An auxiliary selection message of the plan two is generated based on the second template by utilizing the copywriting generation algorithm, and the auxiliary selection message is "This road section often has heavy vehicles driven thereon at this time, and please pay attention to traffic safety". Then, the auxiliary selection message is displayed on the route where "Shunping section" locates, and a reminding icon is displayed, to assist the user in selecting the target route.

Figure 6D:
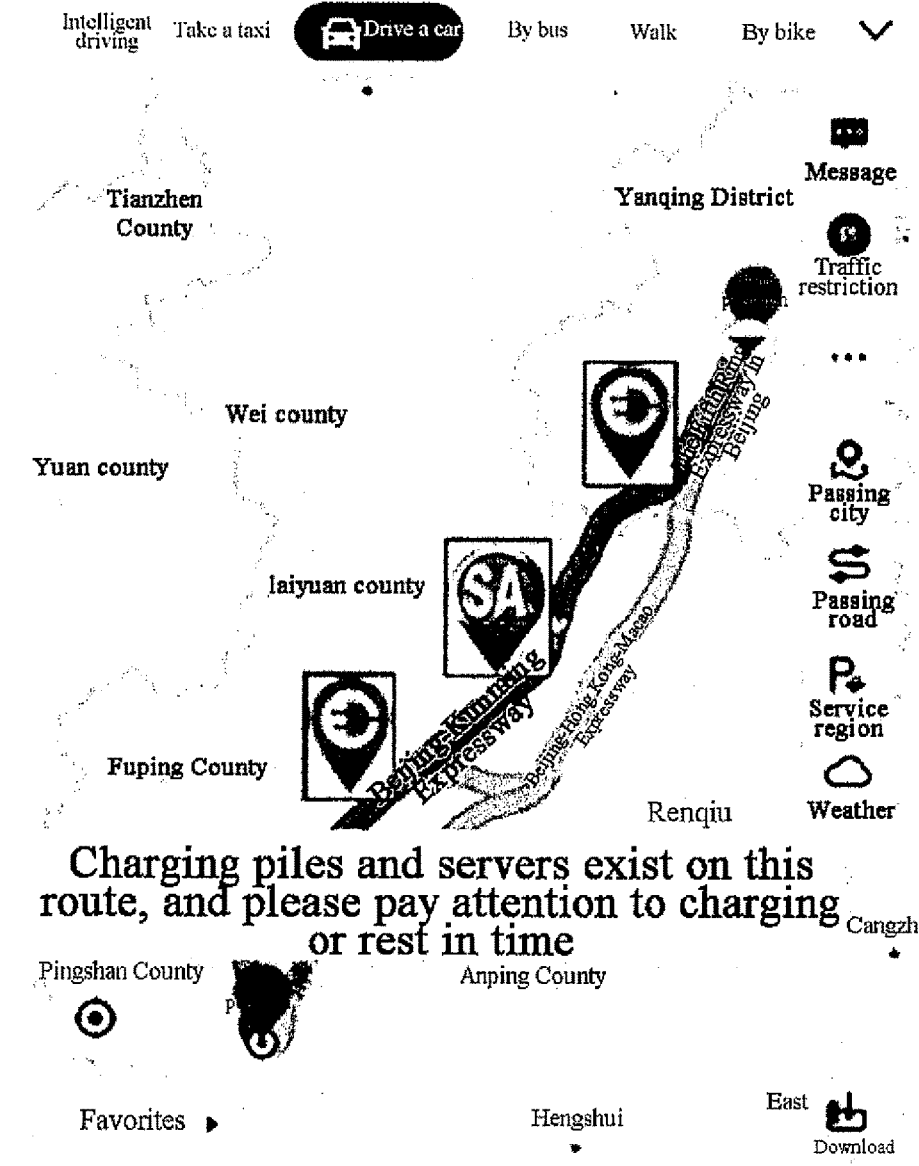

For another example, as illustrated in FIG. 6(d), the start position of the user is "Xi'erqi Haidian District, Beijing", the end position of the user is "Shijiazhuang City", and there are three candidate routes, that is, plan one taking less time, plan two and plan three. When the electronic device determines that the user may drive for a long distance based on a travel distance of the candidate routes, the candidate route currently selected by the user is plan two, and a vehicle type set by the user is an "electric car", road auxiliary information about "service areas" and "charging piles" exist on the candidate route in the plan two is obtained. Then, the road auxiliary information about "service areas" and "charging piles" is matched with the preset copywriting templates to obtain the target copywriting template as a third template. The auxiliary selection message of plan two is generated based on the third template by utilizing the copywriting generation algorithm, and the auxiliary selection message is "Charging piles and servers exist on this route, and please pay attention to charging or rest in time". The auxiliary selection message is displayed on the candidate route of the plan two, and a reminding icon is displayed, to assist the user in selecting the target route. The reminding icon includes an icon of the charging pile and an icon of the service area.

With the navigation method based on an electronic map according to embodiments of the present disclosure, the target copywriting template matched with the target road auxiliary information is obtained, the auxiliary selection message of each candidate route is generated based on the target copywriting template, and the target route is selected from the candidate routes based on the auxiliary selection message. The user selects the target route based on the auxiliary selection message, thereby providing a reference for the user to select the candidate route and improving an accuracy and an applicability of the navigation. In this way, the user may select the navigation route that meets his/her own personalized requirement based on the generated auxiliary selection message, thereby meeting the personalized requirement of the user and improving the user experience.

On the basis of the above embodiments, after the action at block 502, the method also includes: displaying the auxiliary information of a candidate route in response to a selection operation of the user on the selected candidate route.

The selection operation includes: a click-to-expand operation or a route switching operation.

Figure 7:
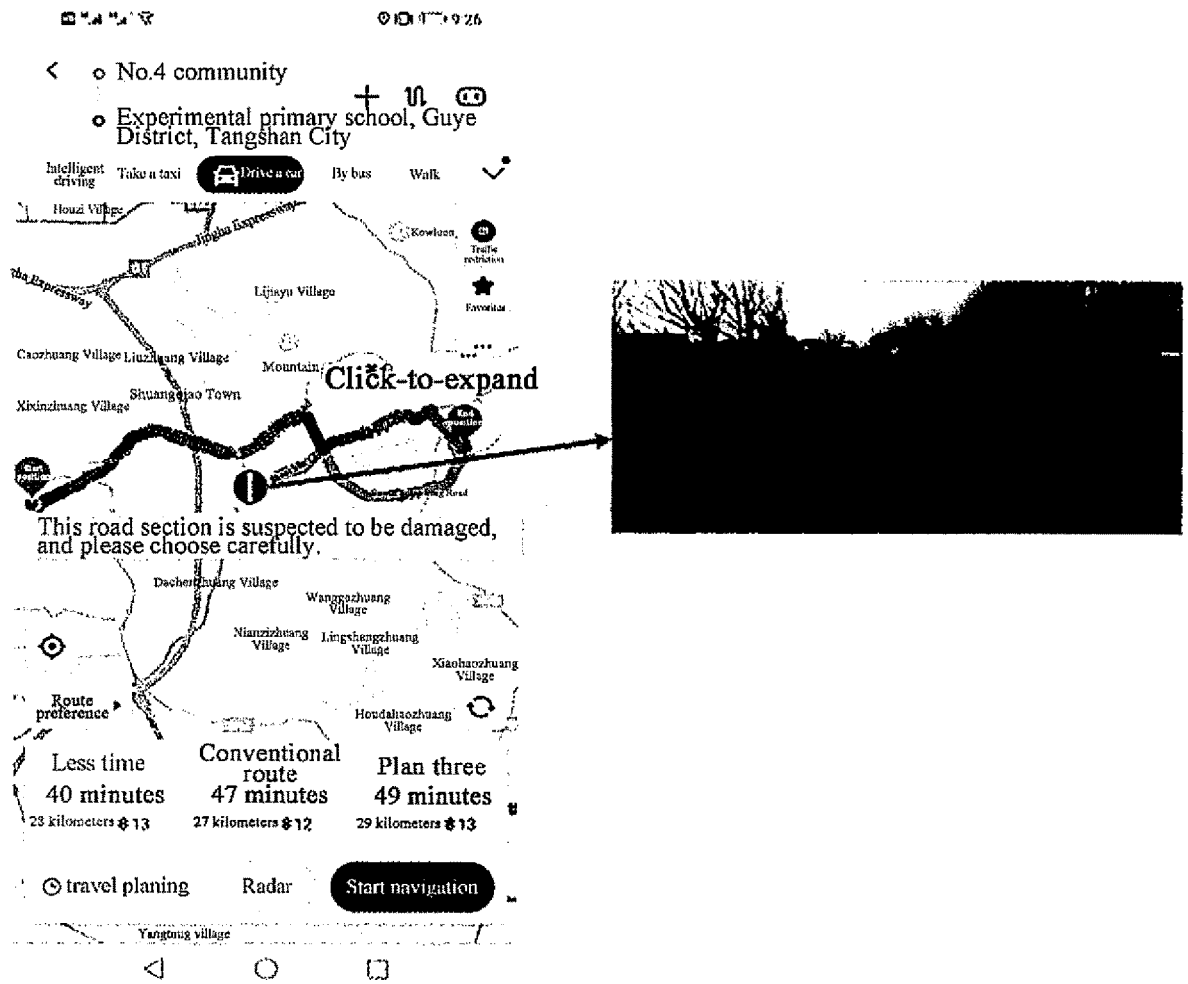
FIG. 7 is a schematic diagram illustrating displaying a panoramic image of a candidate route based on a click and expansion operation of a user according to Embodiment 3 of the present disclosure.

Exemplarily, after the selection operation of the user is received on a display interface, it may be determined whether the selection operation is the click-to-expand operation or the route switching operation. When the selection operation is the click-to-expand operation, the auxiliary selection message of the candidate route is expanded, such that the user may view more detailed information for reference. The detailed information includes a panoramic image of the candidate route, which may be as illustrated in FIG. 7. When the selection operation is the route switching operation, a current candidate route is switched to another route based on the route switching operation, and auxiliary selection message of the switched candidate route is displayed, to help the user select the target route.

In other words, when the user needs to view a detailed auxiliary selection message of the candidate route displayed currently, the auxiliary selection message of the candidate route may be expanded to detail by the selection operation, such that the user may know more detailed auxiliary information. Alternatively, the user may also select to switch the current candidate route to another candidate route to view auxiliary information of other candidate routes, thereby selecting the target route meeting his/her own preference among a plurality of candidate routes.

Embodiment 4

Figure 8:
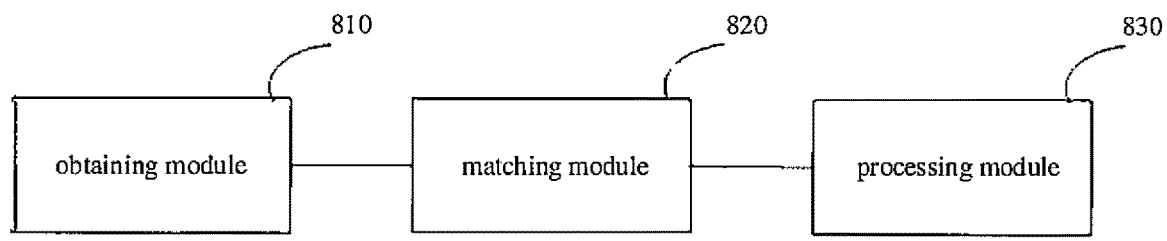
FIG. 8 is a block diagram illustrating a navigation apparatus based on an electronic map according to Embodiment 4 of the present disclosure.

To achieve the above objectives, embodiment 4 of the present disclosure provide a navigation apparatus based on an electronic map. FIG. 8 is a block diagram illustrating a navigation apparatus based on an electronic map according to Embodiment 4 of the present disclosure.

As illustrated in FIG. 8, the navigation apparatus based on an electronic map according to embodiments of the present disclosure includes: an obtaining module 810, a matching module 820, and a processing module 830.

The obtaining module 810 is configured to plan candidate routes based on a start position and an end position of a user, and to obtain a sequence of candidate road sections in each candidate route.

The matching module 820 is configured to match each candidate road section in the sequence of candidate road sections in each candidate route with an association relationship between an actual road section and actual road auxiliary information to obtain a sequence of auxiliary information of each candidate route.

The processing module 830 is configured to sort the auxiliary information in the sequence of auxiliary information of each candidate route to obtain a sorted result corresponding each candidate route, and to select target road auxiliary information from the sequence of auxiliary information of each candidate route based on the sorted result, the target road auxiliary information being configured to select a target route from the candidate routes based on the target road auxiliary information.

As an alternative implementation of embodiments of the present disclosure, the target road auxiliary information includes a road surface condition, a heavy-vehicle presence attribute, a path attribute, a charging station attribute, a gas station attribute or a service area attribute.

As an alternative implementation of embodiments of the present disclosure, the navigation apparatus based on an electronic map according to embodiments of the present disclosure also includes: an image and position obtaining module, an information determining module and an association-relationship establishing module.

The image and position obtaining module is configured to obtain a road image and a collection position of the road image collected by a collection device.

The information determining module is configured to recognize the road image to determine the actual road auxiliary information; in which the actual road auxiliary information comprises the road surface condition, the path attribute, the charging station attribute, the gas station attribute or the service area attribute.

The association-relationship establishing module is configured to establish the association relationship between the actual road auxiliary information and the actual road section based on the collection position.

As an alternative implementation of embodiments of the present disclosure, the navigation apparatus based on an electronic map according to embodiments of the present disclosure also includes: a probability determining module and an association-relationship determining module.

The probability determining module is configured to determine an appearance probability of heavy vehicles on the actual road section within at least two periods based on a number of heavy vehicle trajectories and a number of small vehicle trajectories on the actual road section within the at least two periods.

The association-relationship determining module is configured to determine the association relationship between the actual road section and the actual road auxiliary information within the at least two periods based on the appearance probability of the heavy vehicles, wherein the actual road auxiliary information comprises the heavy-vehicle presence attribute.

As an alternative implementation of embodiments of the present disclosure, the matching module 820 is configured to: match a current time point with the at least two periods to obtain a current period to which the current time point belongs; and match each candidate road section in the sequence of candidate road sections in each candidate route with an association relationship between an actual road section and actual road auxiliary information within the current period, to obtain a sequence of heavy-vehicle presence attributes of each candidate route.

As an alternative implementation of embodiments of the present disclosure, the processing module 830 is configured to: sort the auxiliary information in the sequence of auxiliary information of each candidate route based on a general sorting strategy and/or a user sorting strategy, in which, the user sorting strategy is determined according to information inputted the user and/or a selection behavior of the user for a historical candidate route.

As an alternative implementation of embodiments of the present disclosure, the navigation apparatus based on an electronic map according to embodiments of the present disclosure also includes: a template obtaining module and a message generating module.

The template obtaining module is configured to obtain a target copywriting template matched with the target road auxiliary information.

The message generating module is configured to generate an auxiliary selection message of each candidate route based on the target copywriting template, the auxiliary selection message of each candidate route being configured to select the target route from the candidate routes based on the auxiliary selection message.

As an alternative implementation of embodiments of the present disclosure, the navigation apparatus based on an electronic map according to embodiments of the present disclosure also includes: an information display module.

The information display module is configured to display the auxiliary information of a candidate route in response to a selection operation of the user on the selected candidate route.

It should be noted that, the above description for embodiments of the navigation method based on an electronic map is also applicable to the navigation apparatus based on an electronic map in this embodiment, and has a similar implementation principle, which is not elaborated here.

With the navigation apparatus based on an electronic map according to embodiments of the present disclosure, by obtaining a sequence of candidate road sections in each candidate route planned based on a start position and an end position of a user, each candidate road section in the sequence of candidate road sections in each candidate route is matched with an association relationship between an actual road section and actual road auxiliary information, to obtain a sequence of auxiliary information of each candidate route, the auxiliary information in the sequence of auxiliary information of each candidate route is sorted to select target road auxiliary information from a sorted result, and a target route is selected from the candidate routes based on the target road auxiliary information. Therefore, in a navigation procedure, by providing the planned routes and the auxiliary information of the routes to the user, the user may select a route that meets his/her own requirement based on the auxiliary information of the routes, thereby meeting a personalized requirement of the user for route selection and providing a reference for the user to select the route.

Embodiment 5

According to embodiments of the present disclosure, the present disclosure also provides an electronic device and a readable storage medium.

Figure 9:
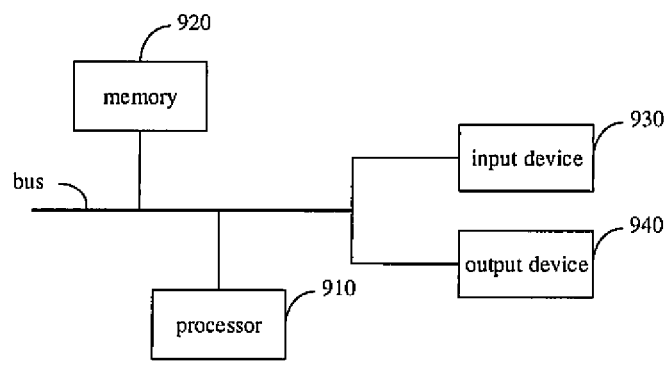
FIG. 9 is a block diagram illustrating an electronic device according to Embodiment 5 of the present disclosure.

As illustrated in FIG. 9, FIG. 9 is a block diagram illustrating an electronic device capable of implementing a navigation method based on an electronic map according to embodiments of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components, connections and relationships of the components, and functions of the components illustrated herein are merely examples, and are not intended to limit the implementation of the present disclosure described and/or claimed herein.

As illustrated in FIG. 9, the electronic device includes: one or more processors 910, a memory 920, and interfaces for connecting various components, including a high-speed interface and a low-speed interface. Various components are connected to each other by different buses, and may be installed on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides some necessary operations (for example, as a server array, a group of blade servers, or a multiprocessor system). In FIG. 9, a processor 910 is taken as an example.

The memory 920 is a non-transitory computer readable storage medium provided by the present disclosure. The memory is configured to store instructions executed by at least one processor, to enable the at least one processor to execute a navigation method based on an electronic map according to the present disclosure. The non-transitory computer readable storage medium according to the present disclosure is configured to store computer instructions. The computer instructions are configured to enable a computer to execute the navigation method based on an electronic map according to the present disclosure.

As the non-transitory computer readable storage medium, the memory 920 may be configured to store non-transitory software programs, non-transitory computer executable programs and modules, such as program instructions/modules (such as, the obtaining module 810, the matching module 820, and the processing module 830 illustrated in FIG. 8) corresponding to the navigation method based on an electronic map according to embodiments of the present disclosure. The processor 910 is configured to execute various functional applications and data processing of the server by operating non-transitory software programs, instructions and modules stored in the memory 920, that is, implements the navigation method based on an electronic map according to the above method embodiment.

The memory 920 may include a storage program region and a storage data region. The storage program region may store an application required by an operating system and at least one function. The storage data region may store data created according to usage of the electronic device. In addition, the memory 920 may include a high-speed random access memory, and may also include a non-transitory memory, such as at least one disk memory device, a flash memory device, or other non-transitory solid-state memory device. In some embodiments, the memory 920 may alternatively include memories remotely located to the processor 910, and these remote memories may be connected to the electronic device through a network. Examples of the above network include, but are not limited to, an Internet, an intranet, a local area network, a mobile communication network and combinations thereof.

The electronic device capable of implementing the navigation method based on an electronic map may also include: an input device 930 and an output device 940. The processor 910, the memory 920, the input device 930, and the output device 940 may be connected through a bus or in other means. In FIG. 9, the bus is taken as an example.

The input device 930 may receive inputted digital or character information, and generate key signal input related to user setting and function control of the electronic device capable of implementing the navigation method based on an electronic map, such as a touch screen, a keypad, a mouse, a track pad, a touch pad, an indicator stick, one or more mouse buttons, a trackball, a joystick and other input device. The output device 940 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal configured to provide the machine instructions and/or data to the programmable processor.

To provide interaction with the user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system (such as, a data server) including a background component, a computing system (such as, an application server) including a middleware component, or a computing system including a front-end component (such as, a user computer having a graphical user interface or a web browser, through which the user may interact with embodiments of the system and technologies described herein), or a computing system including any combination of the background component, the middleware components, or the front-end component. Components of the system may be connected to each other through digital data communication in any form or medium (such as, a communication network). Examples of the communication network include a local area network (LAN), a wide area networks (WAN), the Internet, and a blockchain network.

The computer system may include a client and a server. The client and the server are generally remote from each other and usually interact through the communication network. A relationship between the client and the server is generated by computer programs operated on a corresponding computer and having a client-server relationship with each other.

With the technical solution according to embodiments of the present disclosure, by obtaining a sequence of candidate road sections in each candidate route planned based on a start position and an end position of a user, each candidate road section in the sequence of candidate road sections in each candidate route is matched with an association relationship between an actual road section and actual road auxiliary information, to obtain a sequence of auxiliary information of each candidate route, the auxiliary information in the sequence of auxiliary information of each candidate route is sorted to select target road auxiliary information from a sorted result, and a target route is selected from the candidate routes based on the target road auxiliary information. Therefore, in a navigation procedure, by providing the planned routes and the auxiliary information of the routes to the user, the user may select a route that meets his/her own requirement based on the auxiliary information of the routes, thereby meeting a personalized requirement of the user for route selection and providing a reference for the user to select the route.

It should be understood that, steps may be reordered, added or deleted by utilizing flows in the various forms illustrated above. For example, the steps described in the present disclosure may be executed in parallel, sequentially or in different orders, so long as a desired result of the technical solution disclosed in the present disclosure may be achieved, there is no limitation here.

The above detailed implementation do not limit the protection scope of the present disclosure. It should be understood by the skilled in the art that various modifications, combinations, sub-combinations and substitutions may be made based on design requirements and other factors. Any modification, equivalent substitution and improvement made within the spirit and principle of the present disclosure shall be included in the protection scope of present disclosure.

What is claimed is:

1. A navigation method based on an electronic map, performed by a vehicle-mounted computer, comprising:
    receiving a navigation request from a user in response to a navigation function being initiated, wherein the navigation request includes a start position and an end position of a vehicle;
    marking candidate routes from the start position to the end position generated by a planning algorithm on the electronic map;
    obtaining candidate road sections in each of the candidate routes;
    matching each of the candidate road sections in each of the candidate routes with an association relationship between a road section and road auxiliary information, to obtain a sequence of road auxiliary information for each of the candidate routes;
    for each of the candidate routes, sorting the sequence of road auxiliary information to obtain a sorted result, and selecting target road auxiliary information from the sequence of road auxiliary information based on the sorted result;
    matching the target road auxiliary information with a keyword in preset copywriting templates, and obtaining a target copywriting template matched with the target road auxiliary information;
    generating an auxiliary selection message for each of the candidate routes based on the target copywriting template and displaying the auxiliary selection message for each of the candidate routes on the electronic map, so that the user selects a target route from the candidate routes based on the displayed auxiliary selection message; and
    navigating the vehicle based on the target route;
    before matching each of the candidate road sections in each of the candidate routes, the method further comprises:
    for the road section within at least two periods, determining a ratio of a number of heavy duty vehicle trajectories to a sum of the number of the heavy duty vehicle trajectories and a number of light duty vehicle trajectories as an appearance probability of heavy duty vehicles on the road section within the at least two periods; and
    determining the association relationship between the road section and the road auxiliary information based on the appearance probability of the heavy duty vehicles on the road section within the at least two periods, when the road auxiliary information is a heavy-duty-vehicle presence attribute;
    wherein the method further comprises: in response to receiving a click-to-expand operation on a display interface of the vehicle, expanding the auxiliary selection message of the candidate route and displaying a panoramic image of the candidate route.

2. The method according to claim 1, wherein the target road auxiliary information comprises a road surface condition, the heavy-duty-vehicle presence attribute, a path attribute, a charging station attribute, a gas station attribute or a service area attribute.

3. The method according to claim 2, wherein, before matching each of the candidate road sections in each of the candidate routes, the method further comprises:
    obtaining a road image and a collection position of the road image collected by a collection device;
    recognizing the road image to determine a first road auxiliary information, when the first road auxiliary information comprises the road surface condition, the path attribute, the charging station attribute, the gas station attribute or the service area attribute; and
    establishing the association relationship between the road section and the road auxiliary information based on the collection position, when the road auxiliary information is the first road auxiliary information.

4. The method according to claim 1, wherein matching each of the candidate road sections in each of the candidate routes comprises:
    matching a current time point with the at least two periods to obtain a current period to which the current time point belongs; and
    matching each of the candidate road sections in each of the candidate routes with the association relationship between the road section and the road auxiliary information within the current period, to obtain a sequence of heavy-duty-vehicle presence attributes of each of the candidate routes.

5. The method according to claim 1, wherein sorting the sequence of road auxiliary information comprises:
    for each of the candidate routes, sorting the sequence of road auxiliary information based on a general sorting strategy and/or a user sorting strategy,
    wherein, the user sorting strategy is determined according to information inputted by the user and/or a selection behavior of the user for a historical candidate route.

6. The method according to claim 1, wherein, after generating the auxiliary selection message for each of the candidate routes, the method further comprises:
    in response to a selection operation of the user on the target route from the candidate routes, displaying road auxiliary information of the target route.

7. An electronic device, comprising:
    at least one processor; and
    a memory, communicatively coupled to the at least one processor,
    wherein the memory is configured to store instructions executable by the at least one processor, and when the instructions are executed by the at least one processor, the at least one processor is caused to execute a navigation method based on an electronic map, the method comprising:
    receiving a navigation request from a user in response to a navigation function being initiated, wherein the navigation request includes a start position and an end position of a vehicle;

marking candidate routes from the start position to the end position generated by a planning algorithm on the electronic map;

obtaining candidate road sections in each of the candidate routes;

matching each of the candidate road sections in each of the candidate routes with an association relationship between a road section and road auxiliary information, to obtain a sequence of road auxiliary information for each of the candidate routes;

for each of the candidate routes, sorting the sequence of road auxiliary information to obtain a sorted result, and selecting target road auxiliary information from the sequence of road auxiliary information based on the sorted result;

matching the target road auxiliary information with a keyword in preset copywriting templates, and obtaining a target copywriting template matched with the target road auxiliary information;

generating an auxiliary selection message for each of the candidate routes based on the target copywriting template and displaying the auxiliary selection message for each of the candidate routes on the electronic map, so that the user selects a target route from the candidate routes based on the displayed auxiliary selection message; and navigating the vehicle based on the target route;

before matching each of the candidate road sections in each of the candidate routes, the method further comprises:

for the road section within at least two periods, determining a ratio of a number of heavy duty vehicle trajectories to a sum of the number of the heavy duty vehicle trajectories and a number of light duty vehicle trajectories as an appearance probability of heavy duty vehicles on the road section within the at least two periods; and determining the association relationship between the road section and the road auxiliary information based on the appearance probability of the heavy duty vehicles on the road section within the at least two periods, when the road auxiliary information is a heavy-duty-vehicle presence attribute;

wherein the method further comprises: in response to receiving a click-to-expand operation on a display interface of the vehicle, expanding the auxiliary selection message of the candidate route and displaying a panoramic image of the candidate route.

8. The electronic device according to claim 7, wherein the target road auxiliary information comprises a road surface condition, the heavy-duty-vehicle presence attribute, a path attribute, a charging station attribute, a gas station attribute or a service area attribute.

9. The electronic device according to claim 8, wherein, before matching each of the candidate road sections in each of the candidate routes, the method further comprises:

obtaining a road image and a collection position of the road image collected by a collection device;

recognizing the road image to determine a first road auxiliary information, when the first road auxiliary information comprises the road surface condition, the path attribute, the charging station attribute, the gas station attribute or the service area attribute; and establishing the association relationship between the road section and the road auxiliary information based on the collection position, when the road auxiliary information is the first road auxiliary information.

10. The electronic device according to claim 7, wherein matching each of the candidate road sections in each of the candidate routes comprises:

matching a current time point with the at least two periods to obtain a current period to which the current time point belongs; and matching each of the candidate road sections in each of the candidate routes with the association relationship between the road section and the road auxiliary information within the current period, to obtain a sequence of heavy-duty-vehicle presence attributes of each of the candidate routes.

11. The electronic device according to claim 7, wherein sorting the sequence of road auxiliary information comprises:

for each of the candidate routes, sorting the sequence of road auxiliary information based on a general sorting strategy and/or a user sorting strategy, wherein, the user sorting strategy is determined according to information inputted by the user and/or a selection behavior of the user for a historical candidate route.

12. The electronic device according to claim 7, wherein, after generating the auxiliary selection message for each of the candidate routes, the method further comprises:

in response to a selection operation of the user on the target route from the candidate routes, displaying road auxiliary information of the target route.

13. A non-transitory computer readable storage medium having computer instructions stored thereon, wherein the computer instructions are configured to cause a computer to execute a navigation method based on an electronic map, the method comprising:

receiving a navigation request from a user in response to a navigation function being initiated, wherein the navigation request includes a start position and an end position of a vehicle;

marking candidate routes from the start position to the end position generated by a planning algorithm on the electronic map;

obtaining candidate road sections in each of the candidate routes;

matching each of the candidate road sections in each of the candidate routes with an association relationship between a road section and road auxiliary information, to obtain a sequence of road auxiliary information for each of the candidate routes;

for each of the candidate routes, sorting the sequence of road auxiliary information to obtain a sorted result, and selecting target road auxiliary information from the sequence of road auxiliary information based on the sorted result;

matching the target road auxiliary information with a keyword in preset copywriting templates, and obtaining a target copywriting template matched with the target road auxiliary information;

generating an auxiliary selection message for each of the candidate routes based on the target copywriting template and displaying the auxiliary selection message for each of the candidate routes on the electronic map, so that the user selects a target route from the candidate routes based on the displayed auxiliary selection message; and navigating the vehicle based on the target route;

before matching each of the candidate road sections in each of the candidate routes, the method further comprises:

for the road section within at least two periods, determining a ratio of a number of heavy duty vehicle trajectories to a sum of the number of the heavy duty vehicle trajectories and a number of light duty vehicle trajectories as an appearance probability of heavy duty vehicles on the road section within the at least two periods; and determining the association relationship between the road section and the road auxiliary information based on the appearance probability of the heavy duty vehicles on the road section within the at least two periods, when the road auxiliary information is a heavy-duty-vehicle presence attribute;

wherein the method further comprises: in response to receiving a click-to-expand operation on a display interface of the vehicle, expanding the auxiliary selection message of the candidate route and displaying a panoramic image of the candidate route.

14. The storage medium according to claim 13, wherein the target road auxiliary information comprises a road surface condition, the heavy-duty vehicle presence attribute, a path attribute, a charging station attribute, a gas station attribute or a service area attribute.

15. The storage medium according to claim 14, wherein, before matching each of the candidate road sections in each of the candidate routes, the method further comprises:

obtaining a road image and a collection position of the road image collected by a collection device;

recognizing the road image to determine a first road auxiliary information, when the first road auxiliary information comprises the road surface condition, the path attribute, the charging station attribute, the gas station attribute or the service area attribute; and establishing the association relationship between the road section and the road auxiliary information based on the collection position, when the road auxiliary information is the first road auxiliary information.

* * * * *